United States Patent
Farrell et al.

(10) Patent No.: US 6,445,301 B1
(45) Date of Patent: Sep. 3, 2002

(54) ELECTRONIC PEST MONITORING SYSTEM AND METHOD

(75) Inventors: Melanie S. Farrell, Hartford; Alan L. Smith, Mequon; Edward F. Marshall, Fredonia, all of WI (US)

(73) Assignee: LiphaTech, Inc., Milwaukee, WI (US)

( * ) Notice: Subject to any disclaimer, the term of this patent is extended or adjusted under 35 U.S.C. 154(b) by 0 days.

(21) Appl. No.: 09/659,343

(22) Filed: Sep. 12, 2000

(51) Int. Cl.[7] .............................................. G08B 23/00
(52) U.S. Cl. ............................. 340/573.2; 340/384.2; 340/567; 340/870.16; 43/58; 43/61
(58) Field of Search ........................ 340/573.2, 567, 340/870.16, 384.2; 43/58, 61, 73, 81, 99, 131

(56) References Cited

U.S. PATENT DOCUMENTS

| | | | |
|---|---|---|---|
| 3,815,278 A | 6/1974 | Beaton et al. ................ 43/99 |
| 4,612,724 A | 9/1986 | Alboainin ..................... 43/73 |
| 4,653,221 A * | 3/1987 | Pratscher ...................... 43/64 |
| 4,835,900 A | 6/1989 | Shifflett ........................ 43/58 |
| 4,862,145 A * | 8/1989 | Meehan et al. ........... 340/573.2 |
| 4,884,064 A | 11/1989 | Meehan ....................... 340/541 |
| 4,890,415 A * | 1/1990 | Fressola et al. ............... 43/61 |
| 5,040,326 A * | 8/1991 | Van Dijnsen et al. ........... 43/58 |
| 5,107,619 A | 4/1992 | Zapata et al. .................. 43/81 |
| 5,136,803 A | 8/1992 | Sykes et al. .................. 43/131 |
| 5,185,953 A | 2/1993 | Gross ............................ 43/58 |
| 5,224,287 A | 7/1993 | Knudsen et al. ............... 43/81 |
| 5,272,832 A | 12/1993 | Marshall et al. ............. 43/131 |
| 5,446,992 A | 9/1995 | Stewart ....................... 43/131 |
| 5,448,852 A | 9/1995 | Spragins et al. ............. 43/131 |
| 5,452,539 A | 9/1995 | Kurosawa et al. ............. 43/58 |
| 5,806,237 A | 9/1998 | Nelson et al. ............... 43/131 |
| 5,815,090 A * | 9/1998 | Su ......................... 340/870.16 |
| 5,835,025 A * | 11/1998 | Zufelt et al. ........... 340/870.02 |
| 5,966,075 A * | 10/1999 | Blanks .................... 340/573.2 |

FOREIGN PATENT DOCUMENTS

EP            0283142 A     9/1988

* cited by examiner

*Primary Examiner*—Brent A. Swarthout
(74) *Attorney, Agent, or Firm*—Foley & Lardner

(57) ABSTRACT

An electronic pest monitoring system includes an electronic pest monitoring device which may be used in combination with or separate from a bait box. The electronic pest monitoring device is adapted to be removably attached to a bait box. The electronic pest monitoring device includes a pest detector, such as a passive IR detector, which provides a pest detection signal in response to the presence of a pest. A processor coupled to the pest detector includes a real-time clock, and stores in memory a time and date of occurrence of the pest detection signal and a duration of the presence of the pest. Such pest detection event information may be transmitted from the electronic pest monitoring device over a wireless communications channel, such as an IR communications channel, to a hand-held computer unit for display and analysis.

24 Claims, 3 Drawing Sheets

ELECTRONIC PEST MONITORING SYSTEM AND METHOD

FIELD OF THE INVENTION

The present invention pertains generally to pest control systems and methods for combating pests such as mice, rats, birds, and the like, and, more particularly, to electronic systems and methods for detecting the presence and monitoring the activity of such pests.

BACKGROUND OF THE INVENTION

Small animal pests, such as mice and rats, are typically controlled by the strategic placement of traps and/or poisons. Such traps and/or poisons are placed in areas of known or suspected pest activity. In order for such control methods to be used efficiently and effectively, it is important to have accurate information concerning pest activity, including information on where and when pests are most active. Such information may be used, for example, to minimize the number of traps required to control a pest population. Even more importantly, such information may be used to distribute the minimum necessary amount of poison in specific narrowly targeted locations, thereby both minimizing the cost of the poison application and reducing the risks to, e.g., people, pets, and livestock, associated with placing such poisons in the environment.

Electronic detection and counting devices may be used for monitoring pest activity. An example of such a device is described in U.S. Pat. No. 5,040,326 to Van Dijnsen, et al. This patent describes a system for detecting pests which includes a luring box having an entrance aperture sized to let a small rodent enter the box. A detector or sensor is mounted in the box near the entrance aperture, and is activated by the presence of a rodent in the box. The sensor may be implemented as an active infrared, passive infrared, radar, ultrasonic, or microswitch detector, or the like. The sensor is part of an electronic detector circuit which is also housed in the luring box. The sensor produces a signal which indicates the presence of a rodent in the box. This signal is processed by the detector circuit to provide an output signal. Output signals from one or more luring boxes may be passed to a central registration unit by way of connecting cables. The detection signals are counted, by use of a suitable counter circuit. The number of detection signals counted may be shown on a display and stored in memory in the central registration unit. Each luring box may have its own registration device, in the form of a continuous counter, instead of using a central registration unit.

Such previously known electronic pest monitoring devices are limited in their usefulness both by the limited pest activity information which they provide and in their lack of ease of use. Such devices typically provide only a count which is related to the number of pests entering a selected location in which the monitoring device is positioned. Other potentially valuable information, such as when, e.g., what times of day, most pest activity occurs, and how long pests remain in the monitored area, are not provided by such devices. Such previous pest monitoring devices are also often difficult to deploy and use. As discussed above, such systems may provide pest detection signals from one or more distributed monitors to a central registration unit for counting and display via connecting cables. Such a system can be difficult to deploy, especially in the case where many monitoring devices are required to be positioned over a wide area. Such a deployment using known systems would require the use of extensive amounts of cabling, which can be both costly and difficult to install in a manner which does not interfere with use of an area being monitored. Alternatively, each monitoring device may itself store and/or display a count of the number of pests detected thereby. In order to retrieve such counts from the individual monitoring devices, one must individually recover or examine each such device. Such a process can be very time-consuming, especially where monitoring devices are positioned in relatively physically inaccessible areas, as may often be the case.

What is desired, therefore, is an improved electronic pest monitoring system which provides sufficiently detailed pest activity information to provide effective and efficient pest control, and which is both easy to deploy and use.

SUMMARY OF THE INVENTION

The present invention provides an electronic pest monitoring system and method for obtaining accurate and detailed information on the activity of pests such as mice, rats, birds, and other small animals. An electronic pest monitoring system in accordance with the present invention is both easy to deploy and use. An electronic pest monitoring system in accordance with the present invention includes an electronic pest monitoring device which may be used in combination with, or separate from, a bait box. Thus, an electronic pest monitoring system in accordance with the present invention may include a bait box with an electronic pest monitoring device removably mounted thereon. The bait box may include a section formed therein into which bait is placed for attracting pests in the area into the box. The electronic monitoring device includes a pest detector for detecting pests entering the box. The electronic pest monitoring device may be removably mounted to the bait box on a position thereon such that the detector is positioned over or near the bait holding section of the bait box. The pest detector provides a pest detection signal each time a pest is detected thereby. Pest detection signals are provided by the detector to a microprocessor, which stores in memory detailed information derived from the occurrence of the detection signal, such as the date and time of the detection, and the length of the detection event. Such stored pest detection event information may be retrieved easily from the electronic monitoring device via wireless transfer of the information stored in memory from the electronic monitoring device to a hand-held computer unit for analysis and display.

An electronic pest monitoring device in accordance with the present invention preferably employs a passive infrared (IR) pest detector which detects the motion of a pest moving in the vicinity of the detector. Other types of electrical, optic, or electrical/mechanical detectors may also be employed. Detection signals provided by the detector are amplified and provided to the monitoring device microprocessor. The microprocessor includes a real-time clock and associated memory. Preferably, the associated memory is nonvolatile memory. The microprocessor stores in the nonvolatile memory preferably at least the date and time of a detection and the length of a detection event, based on the detection signal provided by the detector.

The microprocessor is preferably also coupled to a transceiver, for transmitting the pest detection event information stored in memory from the electronic pest monitoring device to, e.g., a hand-held computer unit over a wireless communications link. For example, the microprocessor may preferably communicate with the hand-held computer unit over an infrared data communications link, such as using the IrDa Light communications protocol. Pest detection event information received by the hand-held computer unit may be analyzed and displayed thereon and/or retransferred to another computer for further analysis. The pest detection event information communicated to the hand-held computer unit preferably includes a unique ID number identifying the individual electronic pest monitoring device from which the data was transmitted. Thus, the hand-held computer unit may be used to retrieve and store pest detection event information from many individual electronic pest monitoring devices for later analysis and display.

An electronic pest monitoring device in accordance with the present invention is preferably battery powered. The device microprocessor preferably monitors the available battery power and provides an indication to alert a user when battery replacement is needed. For example, an electronic pest monitoring device in accordance with the present invention may have an LED mounted thereon. The LED is preferably controlled by the microprocessor to flash or provide another visual signal when battery replacement is necessary. Battery status information also may be provided from the microprocessor to the hand-held computer unit along with the pest detection event information provided thereto by the pest monitoring device.

The present invention, therefore, provides an electronic pest monitoring system which provides both accurate and detailed pest activity information and which is both easy to use and deploy. An electronic pest monitoring system in accordance with the present invention provides not only a count of pest detections, but also information on the time of occurrence and duration of such detections. Such information may be provided from a plurality of such devices via a wireless communications link to a hand-held computer unit for display and analysis by a user. Thus, pest activity information may be retrieved from an electronic pest monitoring device in accordance with the present invention without the need for cables or wires or physical recovery or inspection of the device. Such wireless communications also facilitates retrieving pest activity information from electronic pest monitoring devices which are positioned in relatively inaccessible areas. An electronic pest monitoring device in accordance with the present invention may be used in combination with a bait box or similar structure, or removed therefrom for positioning in a location of suspected pest activity where use of a bait box is not necessary or appropriate. For example, an electronic pest monitoring device in accordance with the present invention may be placed, separate from a bait box, in the rafters of a building for monitoring bird activity therein.

Further objects, features, and advantages of the invention will be apparent from the following detailed description taken in conjunction with the accompanying drawings.

DETAILED DESCRIPTION OF THE INVENTION

Figure 1:
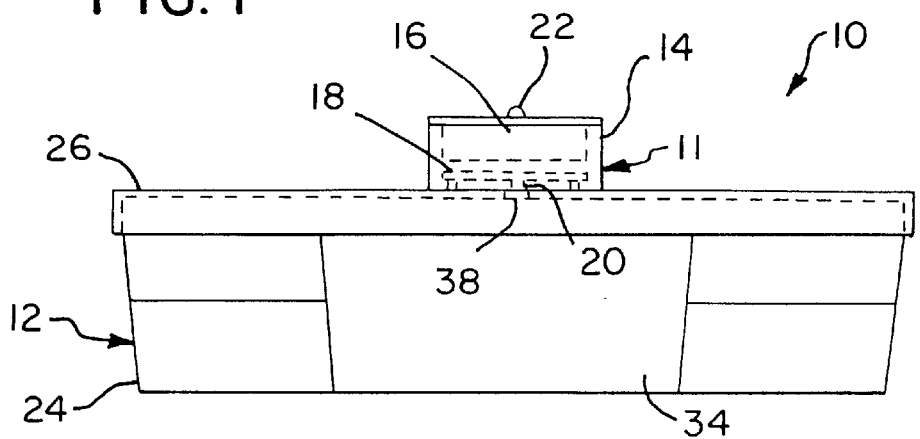
FIG. 1 is a front view of an exemplary electronic pest monitoring system in accordance with the present invention, including an electronic pest monitoring device as employed in combination with a bait box.
Figure 2:
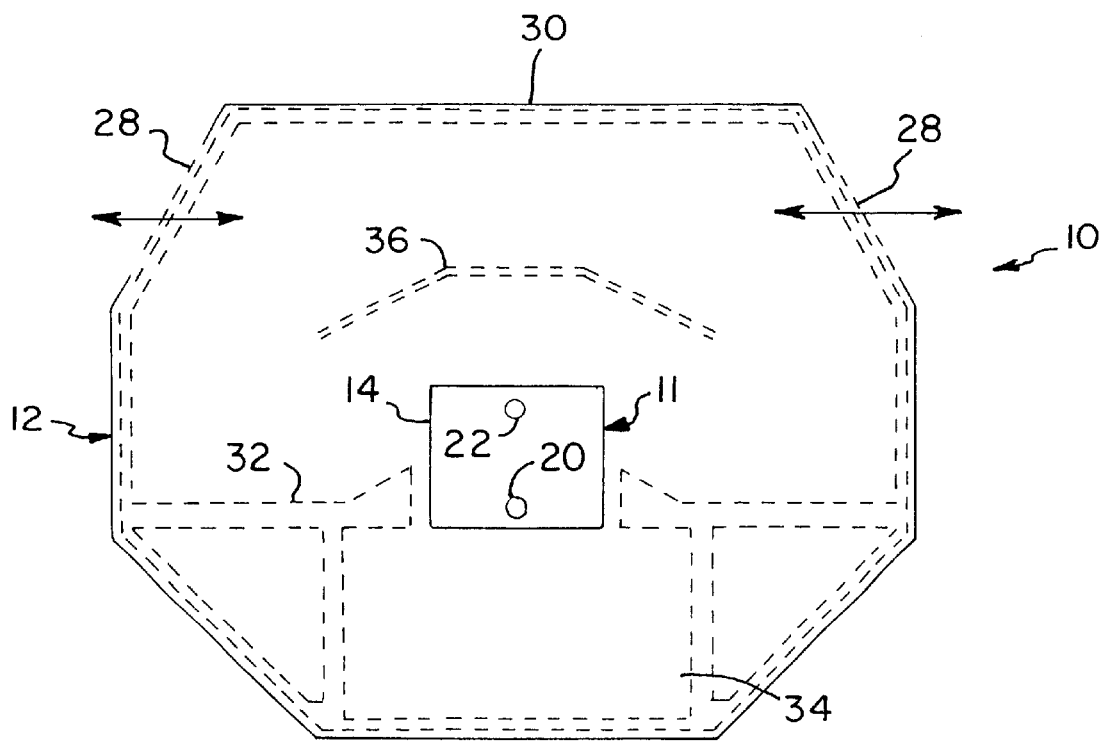
FIG. 2 is a top plan view of the electronic pest monitoring system of FIG. 1.

An exemplary electronic pest monitoring system 10 in accordance with the present invention is illustrated in FIGS. 1 and 2. The electronic pest monitoring system 10 includes an electronic pest monitoring device 11, which may be used in combination with, or separate from, a bait box 12. The electronic pest monitoring device 11 includes electronic circuitry which implements the functions performed by the device, and which will be described in more detail below. The electronic circuitry is preferably enclosed in a device enclosure 14. The device enclosure 14 preferably may be made of a material such as molded plastic, or another material which provides at least some protection of the electronic circuitry contained therein from the elements. For example, the enclosure 14 preferably provides at least sufficient protection to protect the circuit components contained therein from a light rain. The device enclosure 14 preferably includes a removable cover (not shown) formed therein which allows access by a user to a battery compartment 16 formed within the enclosure 14, thereby allowing an operator to remove and replace the device's batteries therefrom. The electronic circuit components for the electronic monitoring device 11 are preferably mounted, in a conventional manner, on a conventional circuit board 18 which is mounted within the enclosure 14 in a conventional manner.

As will be described in more detail below, the electronic pest monitoring device 11 includes a pest activity detector, e.g., a passive IR detector 20. An aperture (not shown) is preferably provided in the device enclosure 14 such that the detector 20 is aligned with or protrudes through the aperture in the enclosure 14. This aperture may be covered by, e.g., an IR transparent window, which does not interfere with operation of the detector 20.

As also will be discussed in more detail below, the electronic pest monitoring device 11 may also include an IR transceiver for communicating over a wireless communications link with a hand-held computer. An IR transparent window is preferably also provided in the enclosure 14 to allow the reception and transmission of IR light by the IR transceiver.

An LED 22 preferably is also mounted on the enclosure 14 so as to protrude from the top thereof. Preferably, the LED 22 protrudes from the top of the enclosure by a sufficient amount such that it is viewable from all directions. As will be described in more detail below, the LED 22 may be controlled to provide a visual warning signal which indicates that the device batteries are nearing depletion.

The bait box 12 may preferably be made of plastic, e.g., by molding in a conventional manner, or from another material such as wood, plexiglass, etc. The bait box 12 may include a base portion 24, which is formed to be open at the top thereof, and a removable cover 26, which is adapted to cover the open top of the base portion 24. The outer wall of the bait box base portion 24 has one or more apertures 28 formed therein. The apertures 28 are preferably sized and shaped to allow animal pests, e.g., mice, rats, etc., which are to be monitored using the system 10 to enter the box 12. The apertures 28 are preferably formed in the bait box 12 in positions thereon such that when an elongated section 30 of the bait box outer wall is placed against a wall or other structure, a mouse, rat, or other small animal running along the wall or other structure will enter the box 12 through one of the apertures 28.

The base portion 24 of the bait box 12 preferably includes one or more internal walls 32 or other structures formed therein. The internal walls 32 may preferably be formed as integral parts of the base portion 24 of a plastic bait box 12 during the molding thereof. The internal walls 32 provide structural rigidity and integrity for the base portion 24 of the bait box 12, and divide the interior of the base portion 24 of the bait box 12 into one or more chambers or sections. One of the sections 34 formed by the internal walls 32 may be formed to hold either poisoned or nonpoisoned bait for attracting pests into the bait box 12. Other internal walls 36 or other structures may be formed in the base portion 24 of the bait box 12 to provide a comfortable sensory environment for pests entering the bait box 12. For example, a wall 36 may be formed in the base portion 24 of the bait box to create an inviting tunnel-like environment for animals entering the box 12. Such structures are useful in increasing the likelihood that pests active in the area of the box will be drawn into the box 12.

The electronic pest monitoring device 11 is preferably removably attachable to the bait box 12. For example, the electronic pest monitoring device enclosure 14 is preferably removably attachable to the cover portion 26 of the bait box 12. The enclosure 14 may be removably mounted to the cover 26 in any conventional manner. For example, corresponding interlocking projections and recesses may be formed in the enclosure 14 and cover 26 to provide for "snapping" the enclosure 14 onto the cover 26. A hook and loop type fastener (Velcro) may, alternatively, be used to removably attach the enclosure 14 to the cover 26 of the bait box 12. Thus, the electronic pest monitoring device 11 may be easily removed from the bait box 12 for, e.g., battery replacement and/or cleaning. In addition, the electronic pest monitoring device 11 may be removed from the bait box 12 for use separate from the bait box 12, such as in areas or positions where pest activity monitoring does not require use of a bait box or use of a bait box would be difficult or otherwise inappropriate. For example, the electronic pest monitoring device 11 may be used separate from the bait box 12 by placing the device 11 in the rafters of a building to monitor bird activity therein. Information from such a device may be used, for example, to determine the best positions for nets or other bird traps.

As illustrated, the electronic pest monitoring device 11 is preferably removably mounted to the bait box cover 26 in a position thereon such that, when the bait box cover 26 is in position on the bait box base section 24, the pest detector 20 is positioned over or nearly over the bait holding section 34 formed in the base section 24 of the bait box 12. An aperture or hole 38 is preferably formed in the cover 26 in a position thereon over or nearly over the bait holding section 34 such that the detector 20 in the electronic monitoring device 11 is aligned with the aperture 38 in the cover 26 when the device 11 is attached to the cover 26. Thus, the detector 20 is preferable positioned to detect the presence of mice, rats, or other animals which feed at bait placed in the bait holding section 34. It should be understood, however, that the electronic pest monitoring device 11 may be mounted in any other appropriate position on or within a bait box 12 or other structure to detect pests entering, passing through, and/or exiting the box 12 or other structure.

Figure 3:
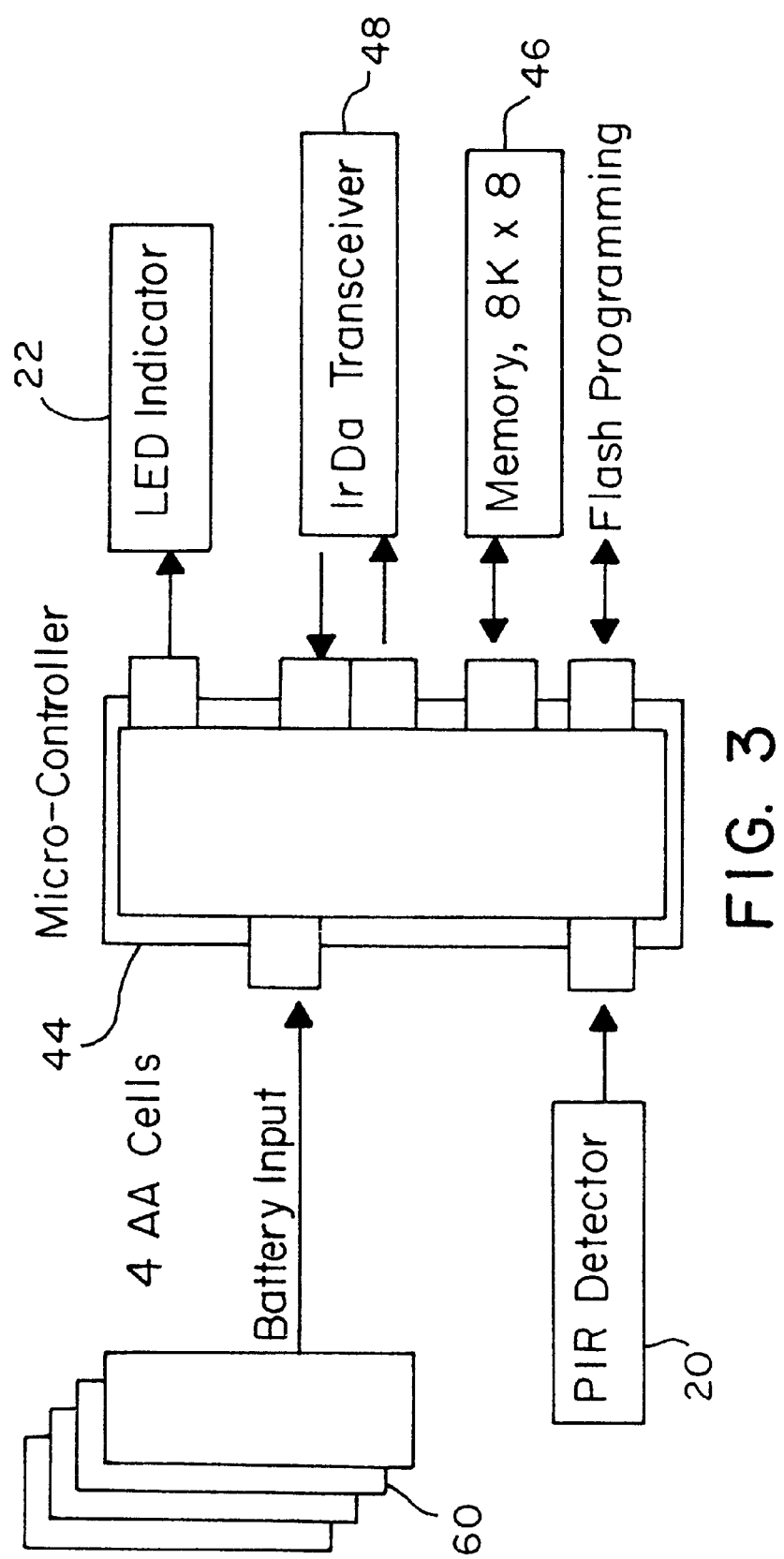
FIG. 3 is a simplified schematic diagram of exemplary circuitry for implementing an electronic pest monitoring device in accordance with the present invention.
Figure 4:
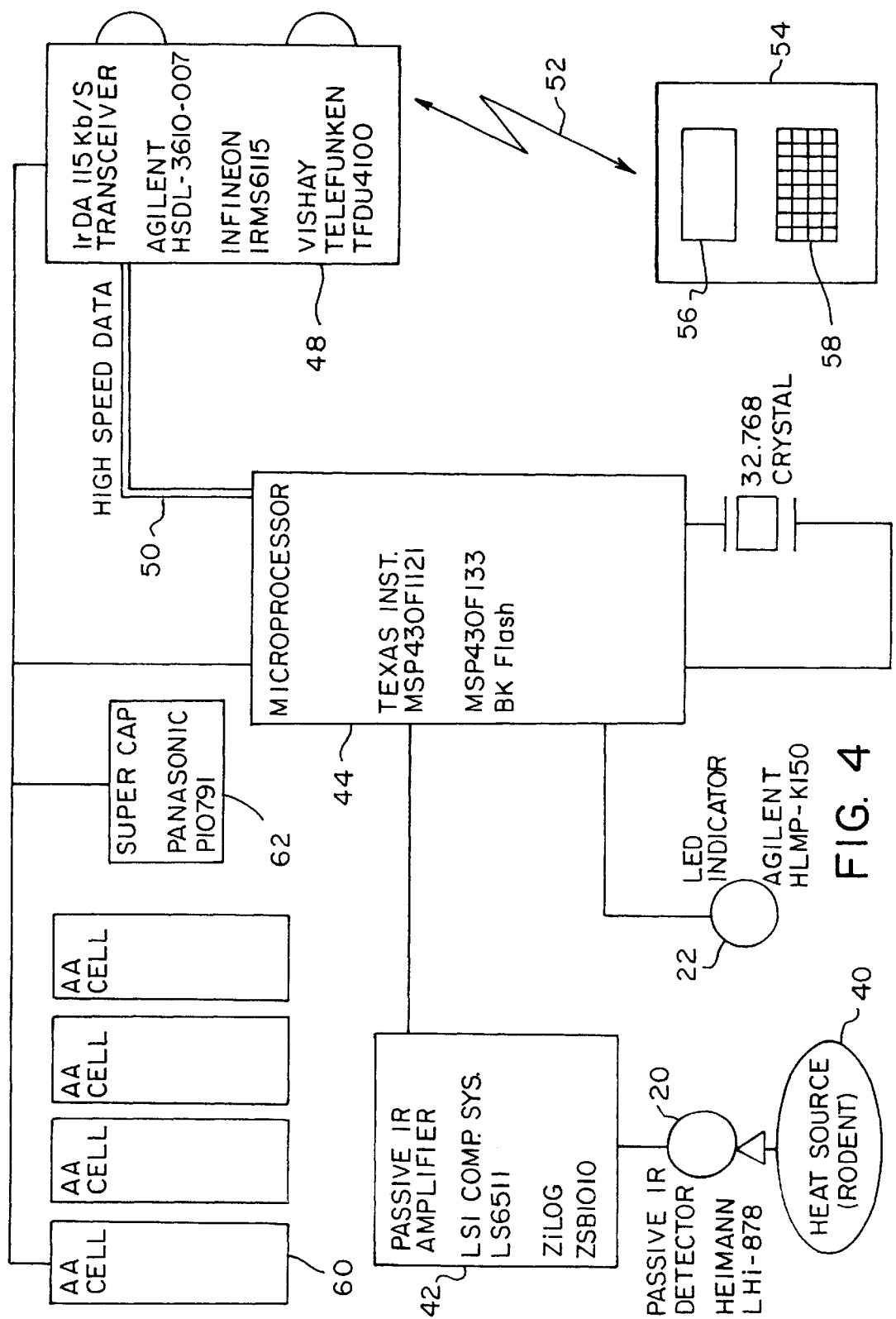
FIG. 4 is a more detailed schematic diagram of exemplary circuitry for implementing an electronic pest monitoring system in accordance with the present invention.

Operation of an electronic pest monitoring device 11 in accordance with the present invention will now be described in further detail with reference to the schematic circuit diagrams of FIGS. 3 and 4. As mentioned above, the electronic pest monitoring device 10 employs a detector 20 for detecting the presence of mice, rats, birds, or other small animals. Preferably, a passive infrared (IR) (pyrolytic) detector for the motion sensing of such an animal is employed. Such a detector may preferably be used, for example, to sense the motion of a mouse-sized object over a range of 0 to 3 inches from the detector. Of course, a passive IR detector for detecting larger or smaller animals, and/or over different distance ranges, may also be employed. An exemplary passive IR detector which may be employed is the Heimann, model No. LHi-878, or equivalent. Such a passive IR element is responsive to radiation with a wavelength range from 5 micrometers to 15 micrometers. Other conventional commercially available passive IR detector elements may also be employed.

The IR detector 20 generates a small current in response to the detection of a pest 40 in the field of view and range of the detector. This current signal is preferably filtered and amplified, e.g., using a conventional commercially available IR amplifier 42. For example, a passive IR amplifier from LSI computer systems, model No. LS6511, or Zilog, model No. ZSB1010, may be used to filter and amplify the small current from the passive infrared detector 20. Of course, other conventional passive IR amplifier and filter circuitry may be employed to filter and amplify the signal from the passive IR detector 20. The amplifier 42 employed preferably draws less than 100 micro-amps at 5V.

Although described in detail herein with reference to the exemplary use of a passive IR pest detector, it should be understood that an electronic pest monitoring system in accordance with the present invention may employ other types of pest detectors which provide electrical signals in response to the detection of pest activity. For example, an active infrared, radar, or ultrasonic detector may be employed to provide pest detection signals. Similarly, an electromechanical device, such as a microswitch, may be used to provide an electrical signal in response to the detection of the presence of pests whose activity are being monitored. No matter which type of detector is employed, it is important that the detector provide an accurate indication of the presence of a pest. Preferably, the detector should have a probability of false detections which is less than one false event per month. Also, whichever detector is employed, the detector should provide a signal which indicates not only that a detection has occurred, but also the length of the detection event, e.g., the duration for which a pest is present in the field of view of the detector.

The filtered and amplified detection signal, from the detector 20 and amplifier 42, is provided to a microprocessor 44 or microcontroller which is programmed to control operation of the electronic pest monitoring device 11. Any conventional microprocessor 44 or microcontroller may be employed. Preferably, the microprocessor 44 selected should have sufficient processing power and speed to perform the functions of an electronic pest monitoring device in accordance with the present invention as described herein. Preferably, and for example, any microprocessor selected should be capable of executing instructions at the rate of at least 8 megahertz. Other preferable criteria for the microprocessor 44 may include low current drain, the ability to measure battery voltage, a real-time clock function, low cost, and the ability to use flash memory. Exemplary commercially available microprocessors 44 which may be employed for this purpose include the Scenix SX28AC, the Texas Instruments MSP430F1121 and the Motorola MC68HC908JL3.

The microprocessor 44 preferably includes a real-time clock function. The microprocessor 44 monitors the detection signals provided by the detector 20 thereto. Each time a pest detection is indicated by the detection signal, the microprocessor determines the time and date of occurrence of the detection (e.g., the year, month, day, hour, minute, and second of the occurrence of the detection) using the real-time clock, and the length of the detection event (e.g., 0–256 seconds). This pest detection event information is stored by the microprocessor 44 in memory 46. The memory 46 may be provided as part of or separate from the microprocessor 44 itself. Preferably, a nonvolatile memory chip 46 or flash-based microcontroller memory is used to store the pest detection event information. Nonvolatile memory remains indefinitely, even with no power applied. Preferably, data stored in the memory 46 will be maintained for at least 5 years, even if no power is applied. Sufficient memory should be provided to store the pest detection event information from a large number of events, for example, from a thousand or more events. For example, a memory capacity of 32K bits may be sufficient for this purpose, depending upon the number of bits required by a particular application to store the time of occurrence and duration data associated with a pest detection event.

The microprocessor 44 (or memory 46) is preferably coupled to a transceiver 48 for transmitting the pest detection event information stored in memory 46 over a wireless communications channel 52 for analysis and display. The microprocessor 44 (or memory 46) is preferably coupled to the transceiver 48 via a high-speed databus 50, which allows the rapid communication of stored data from the microprocessor 44 (or memory 46) to the transceiver 48 for transmission. Preferably, an infrared transceiver, employing, e.g., the IrDa Light communications protocol, or another IR communications protocol, may be employed. A transceiver 48 employing another wireless communications method or protocol, such as an RF, cellular, or other type of transceiver, may also be employed in accordance with the present invention.

The transceiver 48 may transmit the pest detection event information from the electronic pest monitoring device 11 over the wireless communication channel 50 to a hand-held computer unit 54. The hand-held computer unit 54 includes a compatible transceiver for communicating with the transceiver 48 in the electronic pest monitoring device 11. The hand-held computer unit 54 preferably also includes a display 56 for displaying the pest detection event information received from the monitoring device 11, and an operator input 58, such as a keyboard. The transmission of data from the electronic pest monitoring device 11 to the hand-held computer unit 54 may be implemented as a dump of the contents of the device memory 46 to the hand-held computer unit 54, which is initiated by an operator using the unit 54. The data transmitted to the computer unit 54 may include a unique ID number, identifying the individual monitoring device 11 from which the information was sent. An exemplary hand-held computer unit 54 which may be employed is a Palm Pilot or similar hand-held computer device, which may be programmed to display and/or analyze the information provided thereto by one or more electronic pest monitoring devices 11.

The microprocessor 44, and other circuit components of the electronic pest monitoring device 11, are preferably provided power by one or more batteries 58. For example, four AA batteries may be used to provide power to the device 11. Of course, different sized and different numbers of batteries may be employed depending upon the circuit components employed and the desired time between battery changes. Preferably, the batteries and circuit components are selected such that a relatively long battery life, e.g., six months or longer, is provided before a battery change is required. A separate energy storage element 62, e.g., a relatively large capacitor, preferably may be provided to store temporarily energy from the batteries 60. In the event of removal of the batteries, e.g., during a battery change, the energy storage element 62 maintains operation of the microprocessor 44, or, at least, the real-time clock operation thereof, for a certain duration sufficient to allow the batteries to be changed, e.g., 30 seconds. This allows replacement of batteries nearing the end of their useful life without losing the real-time clock setting. An electronic pest monitoring device in accordance with the present invention may be provided from the factory with batteries installed. Therefore, the real-time clock may be factory set, and should not need to be reset by a user unless the device batteries are allowed to be completely drained to a point where they cannot provide sufficient power to the microprocessor 44 to maintain the real-time clock.

The microprocessor 44 preferably monitors the battery condition, and provides a warning to an operator when battery replacement is required. For example, the microprocessor 44 may monitor the battery voltage, and provide an indication to an operator when the battery voltage drops below a certain level, wherein such level is sufficient to provide power to the microprocessor but indicates that replacement of the batteries in the near future will be necessary. In response to such a voltage drop, the LED 22 may be flashed on and off, or some other visual or audible indication provided. In addition, the battery voltage information monitored by the microprocessor 44 may be transmitted to the hand-held computer device 54 along with the pest detection event information. Thus, an operator may be provided a warning on the hand-held computer device 54 that battery replacement is required.

It should be understood that the present invention is not limited to the particular exemplary applications and embodiments illustrated and described herein, but embraces such modified forms thereof as come within the scope of the following claims. In particular, the functions performed by an electronic pest monitoring device in accordance with the present invention may be implemented by a person skilled in the art using a variety of analog and/or digital circuit components.

What is claimed is:

1. An electronic pest monitoring device, comprising:
   (a) a pest detector providing a pest detection signal in response to the current presence of a pest for a duration corresponding to the current presence of a pest; and
   (b) a processor coupled to the pest detector to receive the pest detection signal and adapted to store in memory a plurality of times, wherein each time stored in memory corresponds to an initial time of occurrence of the pest detection signal, wherein the processor is additionally adapted to store in memory a plurality of durations, wherein each duration stored in memory corresponds to a duration of the pest detection signal corresponding to the current presence of a pest.

2. The electronic pest monitoring device of claim 1 wherein the pest detector is a passive infrared detector.

3. The electronic pest monitoring device of claim 1 wherein the processor includes a real-time clock and wherein the plurality of times of occurrence stored in memory include dates and times corresponding to initial times of occurrence of the pest detection signal.

4. The electronic pest monitoring device of claim 1 wherein the memory is non-volatile memory.

5. The electronic pest monitoring device of claim 1 comprising additionally an enclosure for the pest detector and the processor, and wherein the enclosure is adapted to be removably attached to a bait box such that the pest detector provides the pest detection signal in response to the current presence of a pest in the bait box when the enclosure is attached to the bait box and provides the pest detection signal in response to the presence of a pest when the enclosure is removed from the bait box.

6. The electronic pest monitoring device of claim 1 comprising additionally a transceiver for transmitting the times of occurrence stored in memory from the device over a wireless communication channel.

7. The electronic pest monitoring device of claim 6 wherein the transceiver is an infrared transceiver.

8. The electronic pest monitoring device of claim 6 comprising additionally a hand-held computer unit adapted to receive the times of occurrence transmitted by the transceiver.

9. An electronic pest monitoring device, comprising:
  (a) a pest detector providing a pest detection signal indicating the current presence of a pest for a duration corresponding to the current presence of the pest; and
  (b) a processor coupled to the pest detector to receive the pest detection signal and adapted to store in a memory a plurality of durations, wherein each duration stored in memory corresponds to a duration of the current presence of a pest.

10. The electronic pest monitoring device of claim 9 wherein the pest detector is a passive infrared detector.

11. The electronic pest monitoring device of claim 9 wherein the processor includes a real-time clock and wherein the processor is adapted to store in the memory a plurality of dates and times corresponding to initial times of occurrence of the pest detection signal.

12. The electronic pest monitoring device of claim 9 wherein the memory is non-volatile memory.

13. The electronic pest monitoring device of claim 9 comprising additionally an enclosure for the pest detector and the processor, and wherein the enclosure is adapted to be removably attached to a bait box such that the pest detector provides the pest detection signal in response to the current presence of a pest in the bait box when the enclosure is attached to the bait box and provides the pest detection signal in response to the presence of a pest when the enclosure is removed from a bait box.

14. The electronic pest monitoring device of claim 9 comprising additionally a transceiver for transmitting the durations stored in memory from the device over a wireless communication channel.

15. The electronic pest monitoring device of claim 14 wherein the transceiver is an infrared transceiver.

16. The electronic pest monitoring device of claim 14 comprising additionally a hand-held computer unit adapted to receive the durations transmitted by the transceiver.

17. A method of monitoring pest activity, comprising the steps of:
  (a) detecting the current presence of a pest and the duration of the current presence of the pest using a pest detector; and
  (b) storing in a memory a plurality of durations, wherein each duration stored in memory corresponds to the duration of the current presence of a pest detected by the pest detector.

18. The method of claim 17 wherein the step of detecting the presence of a pest using a pest detector includes the step of detecting a pest using a passive infrared pest detector.

19. The method of claim 17 comprising additionally the step of storing in memory a plurality of dates and times, wherein each date and time stored in memory corresponds to the initial occurrence of the detection of a pest by the pest detector.

20. The method of claim 17 wherein the step of detecting the presence of a pest using a pest detector includes the step of positioning a pest detector on a bait box.

21. The method of claim 20 wherein the step of detecting the presence of a pest using a pest detector includes the step of positioning a pest detector over a bait holding section formed in a bait box.

22. The method of claim 17 comprising additionally the step of transmitting the durations stored in memory over a wireless communication channel.

23. The method of claim 22 wherein the step of transmitting the durations stored in memory over a wireless communication channel includes the step of transmitting the durations stored in memory over an infrared communication channel.

24. The method of claim 22 comprising additionally the step of receiving the durations transmitted over the wireless communication channel by a hand-held computer unit.

* * * * *